United States Patent
LaFay et al.

(10) Patent No.: US 7,507,284 B2
(45) Date of Patent: Mar. 24, 2009

(54) SANDCASTING PATTERN COATING COMPOSITIONS CONTAINING GRAPHITE

(75) Inventors: Victor S. LaFay, Cincinnati, OH (US); Stephen L. Neltner, Alexandria, KY (US)

(73) Assignee: The Hill and Griffith Company, Cincinnati, OH (US)

( * ) Notice: Subject to any disclaimer, the term of this patent is extended or adjusted under 35 U.S.C. 154(b) by 902 days.

(21) Appl. No.: 10/944,471

(22) Filed: Sep. 17, 2004

(65) Prior Publication Data

US 2006/0062905 A1    Mar. 23, 2006

(51) Int. Cl.
  *B28B 7/38* (2006.01)
  *B28B 7/36* (2006.01)
  *B05D 1/00* (2006.01)
  *C09D 5/00* (2006.01)
  *C09D 191/00* (2006.01)

(52) U.S. Cl. .................. 106/38.22; 106/2; 106/38.24; 427/133; 427/134; 427/230

(58) Field of Classification Search ............ 106/2, 106/38.24, 38.22; 427/133, 134, 230
See application file for complete search history.

(56) References Cited

U.S. PATENT DOCUMENTS

| | | | | | |
|---|---|---|---|---|---|
| 2,914,823 | A | * | 12/1959 | Bean | 164/159 |
| 3,978,906 | A | | 9/1976 | Lemon | |
| 4,096,293 | A | * | 6/1978 | Skubon et al. | 427/134 |
| 4,191,578 | A | * | 3/1980 | Carter | 106/1.13 |
| 4,194,915 | A | * | 3/1980 | Perkins | 106/38.25 |
| 4,296,793 | A | * | 10/1981 | Yasinsky et al. | 164/24 |
| 4,674,553 | A | * | 6/1987 | Witt | 164/33 |
| 4,676,997 | A | * | 6/1987 | LaFay et al. | 427/134 |
| 4,980,394 | A | | 12/1990 | Lemon et al. | |
| 5,573,580 | A | * | 11/1996 | Bartsch et al. | 106/38.27 |
| 5,587,008 | A | * | 12/1996 | LaFay et al. | 106/38.51 |
| 5,810,918 | A | | 9/1998 | Landis | |
| 6,506,817 | B1 | | 1/2003 | Buchler | |
| 6,960,367 | B2 | * | 11/2005 | LaFay et al. | 427/134 |

FOREIGN PATENT DOCUMENTS

JP         58009742 A   *   1/1983

OTHER PUBLICATIONS

V.S. LaFay, et al., "Green Sand without Seacoal" (Jun. 2004).
V.S. LaFay, et al., "Significant Reduction in the Emission Characteristics of the Green Sand Process" (Apr. 2005).
"Emission Comparison of PCS Parting Spray Greensand Systems," prepared by Technikon LLC, Casting Reduction Program (Oct. 2003).

* cited by examiner

*Primary Examiner*—Anthony J Green
(74) *Attorney, Agent, or Firm*—Thompson Hine LLP

(57) ABSTRACT

Sand casting is an old art. In this molding process sand is compacted around a pattern and the pattern is removed, leaving a mold cavity the shape of the pattern. Molten metal can then be poured into the cavity to form the object. To increase the life of the mold, and to make removal of the pattern easier, the pattern must be coated with a protective material. A pattern coating composition is disclosed wherein the composition is an emulsion including oil, water, graphite, a water dispersible amine, and a clay reactive with the amine to form an organophylic clay.

18 Claims, No Drawings

SANDCASTING PATTERN COATING COMPOSITIONS CONTAINING GRAPHITE

BACKGROUND OF THE INVENTION

This invention pertains to the casting of metals in sand molds, and particularly to methods and materials for increasing the lives of the mold patterns that are employed therein by incorporating graphite into the pattern coating composition.

The introduction of a molten metal into a cavity, or mold, where upon solidification, the resulting casting becomes an object whose shape was determined by the mold, is an old art. Equally as old is sand casting. In this molding process a wood, metal or plastic pattern is fabricated in the shape of the part to be produced. Sand is then compacted around the pattern in such a way that the top portion of the mold and the pattern can be removed, leaving a mold cavity in the shape of the pattern. Molten metal is then poured into the mold cavity.

It is well known that to increase the life of a mold and to make the removal of the casting easier, the surfaces of the mold cavity must be coated with a protective material. In the case of sand castings however it is the pattern which must be coated. Prior art coating compositions however deal primarily with mold coatings rather than pattern coatings.

Coatings for foundry cores and molds are basically mold release agents. They are used to obtain smoother casting surfaces with fewer defects. In its simplest form such a coating is simply a suspension of bentonite, kaolin and other members of the montmorillonite group of clays in water. As in the case of moldings, the use of sandcasting patterns is not without its own problems. The pattern surfaces erode and pit when successive mold cavities are produced using them. When such erosion occurs, molding sands have a greater tendency to adhere to the pattern when it is removed, affecting the mold cavity.

Commonly assigned U.S. patent application Ser. No. 10/072,638, now U.S. Pat. No. 6,960,367, issued Nov. 1, 2005, discloses a pattern coating composition comprising vegetable oil and a viscosity reducer such as mineral seal oil, alcohol or mixtures thereof.

Pattern release coatings in accordance with certain aspects of the present invention provide improved properties particularly when used in conjunction with green sand compositions in which the amount of seacoal has been reduced or completely eliminated. Seacoal is typically used in green sand to provide a variety of benefits. Seacoal develops lustrous carbon which results in a layer of carbonaceous material at the mold metal interface. Seacoal also reduces wall movement by developing into coking material during the metal casting process to form a cushion between the sand grains (Cushion Theory). Furthermore, seacoal contributes to the formation of an oolithic layer on the surface of sand grains. The oolithic layer provides various benefits including improving the flowability of molding sand and reducing roughness of the casting surface. Seacoal also contributes to a reducing atmosphere in the green sand mold during the metal casting process.

Efforts are underway to eliminate or reduce the amount of seacoal in green sand to reduce emissions associated with carbonaceous additives generated during the metal casting process. One method for replacing seacoal involves the addition of graphite into the green sand molding process by adding the graphite to the sand as a preblend or a separate addition. It is also known to rub graphite or plumbago on the surface of molds to enhance the release characteristic of castings. However, there is not sufficient time with modern high density molding equipment for an operator of a molding machine to rub plumbago on the mold. Accordingly, it would be desirable to have a method of providing lustrous carbon while eliminating or reducing the amount of seacoal in a manner that does not interfere with the molding process.

Pattern coating compositions in accordance certain aspects of the present invention provide many of the benefits associated with the use of seacoal in green sand while avoiding or reducing the problems associated with emissions from the seacoal.

SUMMARY OF THE INVENTION

The present invention relates to a method of protecting foundry molds from eroding and pitting during sand casting by preventing adherence of casting sand to surfaces of casting patterns using a pattern coating composition containing graphite. In accordance with one aspect of the invention, the method involves applying a pattern coating composition containing graphite to the surfaces of a casting pattern in an amount sufficient to form a coating which prevents that adherence and affords that protection. The pattern coating composition in accordance with a particular embodiment of the invention is an emulsified oil, having incorporated therein an organophylic clay, included in the coating as such or as a clay-water dispersible amine mixture and graphite dispersed in the emulsion. The emulsion, typically, is a 40/60 to 60/40 by weight oil-water emulsion.

DETAILED DESCRIPTION OF THE INVENTION

In describing the preferred embodiment, certain terminology will be utilized for the sake of clarity. It is intended that such terminology include not only the recited embodiments but all technical equivalents which operate in a similar manner, for a similar purpose, to achieve a similar result. All documents cited are, in relevant part, incorporated herein by reference; the citation of any document is not to be construed as an admission that it is prior art with respect to the present invention.

This invention relates to an improvement of the processes for coating sand casting patterns with a pattern coating composition wherein the pattern coating composition contains graphite. The pattern coating composition in accordance with one embodiment is prepared by forming an aqueous emulsion of oil using a water dispersible amine and a clay reactive therewith as emulsifiers and adding up to about 20 weight percent graphite, particularly from about 0.05 to about 15 weight percent, more particularly from about 2 to about 10 weight percent graphite to the emulsion. The addition of 5% graphite by weight has been found to work particularly well. Alternatively, the graphite can be added before emulsification. The form of graphite is not particularly critical; crystalline or amorphous graphite can be used.

It will be appreciated that the amine and the clay react to form an organophylic clay, the quantity of organophylic being sufficient to stabilize the emulsion, generally two to five weight percent organophylic clay based on the weight of the oil-water mixture. In accordance with a particular embodiment of the present invention, the oil comprises a vegetable oil such that the oil and water emulsion of this embodiment presents no volatility and no flash point problems. Furthermore, in lieu of a clay and a dispersible amine, an organophylic clay can be used to stabilize the emulsion.

Organophylic clays for years have provided viscosities and suspending properties required of drilling muds. The pattern coating composition in accordance with certain aspects of the present invention borrows from this drilling mud art. Consequently organophylic clays themselves are well known. They are prepared by treating a clay with an amine or an amine salt. Usually the clay-amine reaction is effected by mixing a clay dispersion with about 50 to 200 milequivalents of amine per 100 grams of clay. Amines which can be incorporated in the emulsion, or which can be reacted with the clays to form organophylic emulsifying agents are high molecular weight straight chain and cyclic aliphatic amines. Desirable amines are those having six to twenty four carbon atoms in the alkyl chains, for example, hexyl amine, heptyl amine, decyl amine, undecyl amine, tridecyl amine, pentadecyl amine, heptadecyl amine, cetyl amine, and cyclic tertiary amines such as tall oil or cottonseed oil imidazolines as well as their salts.

The clays normally utilized in the preparation of organophylic clays and hence those preferred herein are those containing aluminum and magnesium atoms along with the silica which is characteristic of such clays. This includes such clays as bentonite, attapulgite, sepiolite and palygorskite, but excludes muscovite or mica and kaolinitic clays. Again, it will be appreciated that the organophylic clays can be prepared in situ. Thus, in addition to incorporating, say, octadecylammonium bentonite in a mineral seal oil-water mixture, bentonite and octadecyl amine acetate can be included to the mixture to form the desired emulsion.

Examples of useful oils for preparing emulsions include petroleum oils, vegetable oils and combinations thereof. Mineral seal oil is one example of a particularly useful petroleum oil. Vegetable oils useful in the present invention are not particularly limited. In general, any vegetable oil may be used. Examples of vegetable oils useful in the present invention include, but are not limited to, corn oil, sesame oil, rapeseed oil, sunflower oil, palm oil, olive oil, coconut oil, peanut oil, soybean oil, canola oil. Corn oil is particularly useful.

Although fatty acids are not required to be added in the pattern coating compositions, they can be added to enhance release properties. The fatty acids useful in accordance with the present invention include long chain fatty acids such as $C_{10}$-$C_{24}$ saturated, mono-unsaturated or di-unsaturated carboxylic acids which are liquids at room temperature. Preferred long chain fatty acids are mono-unsaturated $C_{16}$-$C_{20}$ carboxylic acids which are liquids at room temperature. Examples of useful fatty acids include, but are not limited to, palmitic acid, stearic acid, myristic acid, lauric acid, oleic acid, linoleic acid, and linolenic acid. A particularly useful fatty acid is oleic acid. The fatty acid portion of the formulation can range from 0 to 10% based on weight. Typical amounts of fatty acid will range from 1 to 3% by weight.

The pattern coating composition of the present invention is applied in an amount sufficient to provide the desired release properties from the casting pattern. Typically, this will correspond to a coating thickness of from about 2 to about 10 mils. In accordance with particular embodiments of the present invention, the coating is applied at a coating thickness of from about 6 to 8 mils. Of course, additional material can be applied to increase release properties.

The pattern coating composition of the present invention, while useful in a variety of sandcasting operations, is particularly beneficial when used with molding sand in which the amount of seacoal has been reduced or eliminated completed. Efforts to reduce or eliminate seacoal have also been directed to seacoal supplements such as anthracite coal, gilsonite, causticized lignite, coke, and various forms of seacoal. Seacoal and/or seacoal supplements may be present in conventional green sand compositions at levels up to about 10% by weight. More typically, the seacoal and/or seacoal supplements may be present in a green sand composition at levels of about 4 to about 6% by weight. In accordance with particular aspects of the present invention, the seacoal and/or seacoal supplements may be reduced from the typical amounts used or eliminated completely. Accordingly, in accordance with particular embodiments of the present invention, the amount of seacoal and/or seacoal supplements in the green sand may be from about 0 to 10% by weight, from about 0 to 5% by weight, or from about 0-2% by weight. Casting weight and design (surface area) are factors to be considered in determining the extent to which the seacoal can be removed from green sand. Typically, smaller iron castings with varying designs provide opportunities for using molding sand without seacoal. The extent to which seacoal can be completely eliminated or reduced significantly varies according to casting weight, molding sand, casting design and molding process. In some cases it may be beneficial to replace seacoal in the green sand with some of the previously mentioned seacoal supplements which can provide desirable properties in the green sand without many of the negative properties associated with seacoal. Anthracite coal and causticized lignite are examples of seacoal supplements typically used.

One benefit associated with reducing or eliminating the seacoal is to reduce the emission characteristics of green sand. The following table illustrates the reduction in emissions obtaining by eliminating seacoal from a green sand system.

TABLE 1

Comparison of Emission Characteristics of Green Sand With and Without Seacoal

| Compound or Material | Sand System Average With Seacoal and Release Agent (lb/ton metal poured) | Sand System Without Seacoal With Release Agent Only (lb/ton metal poured) | Sand System Without Seacoal With Release Agent Containing Graphite (lb/ton metal poured) |
|---|---|---|---|
| Sum of VOC's | 0.41 | 0.08 | 0.06 |
| Sum of HAP's | 0.35 | 0.06 | 0.05 |
| Sum of POM's | 0.05 | 0.003 | 0.003 |

The above table illustrates the reduced emissions associated with using green sand without seacoal. The "Sum of VOC's" is based on the sum of the individual target volatile organic compounds measured and includes the selected HAP's and selected polycyclic organic materials (POM's) listed in the Clean Air Act Amendments of 1990. The "Sum of HAP's" is the sum of the individual target HAP's measured and includes the selected POM's. Finally, the "Sum of POM's" is the sum of all of the polycyclic organic material measured.

A graphite-based liquid pattern-coating composition in accordance with one aspect of the present invention was measured as producing about 50% less total gaseous organic concentration (TGOC) according to U.S. EPA Method 25A and about 34% less hydrocarbons as hexane when compared to a conventional release agent without graphite.

Having given the teachings of this invention, it will now be illustrated by means of specific examples.

EXAMPLE 1

An emulsion can be prepared using corn oil and water to form the following composition.

| MATERIAL | PARTS BY WEIGHT |
| --- | --- |
| Mineral Seal oil | 4000 |
| Water | 4000 |
| Amine* | 200 |
| Bentonite | 200 |
| Graphite | 420 |

*1-hydroxyethyl-2-tall oil imidazoline

The above materials, when mixed in an ordinary mixer, produce a stable emulsion, which is not affected by cold or hot temperatures. When frozen, the material returns to a stable emulsion after minor mixing. When used on the pattern face in a green sand molding facility the product gives excellent results.

Even though a desirable, stable emulsion is formed by the procedure of Example 1, at times it will be desirable to incorporate certain additives in the composition. This is illustrated by the example which follows.

EXAMPLE 2

Following the procedure of Example 1 a parting composition can be prepared using the same materials plus additional ingredients to further improve the stability and application properties of the product. The ingredients are as follows:

| MATERIAL | PARTS BY WEIGHT |
| --- | --- |
| Mineral Seal oil | 4600 |
| Water | 4730 |
| Bentonite | 230 |
| Amine* | 230 |
| Isopropanol | 230 |
| Oleic acid | 100 |
| Graphite | 500 |

*Amine = Octadecyl amine acetate

When used in an ordinary mixer, the foregoing ingredients produce a stable emulsion which is not affected by cold or hot temperatures. When frozen, the material returns to a stable emulsion after minor mixing when applied to the pattern face in a green sand molding facility. The composition will wet the surface of the pattern with an improved efficiency.

EXAMPLE 3

Following Example 1 a pattern coating composition can be prepared using additional ingredients.

| MATERIAL | PARTS BY WEIGHT |
| --- | --- |
| Mineral Seal oil | 4550 |
| Water | 4550 |
| Diisopropanol | 230 |
| Hexamine | 340 |
| Attapulgite | 230 |
| Oleic acid | 100 |
| Isopropanol | 230 |
| Graphite | 510 |

This composition has the advantage that it will require less mixing action in an ordinary mixer to form a stable emulsion.

EXAMPLE 4

Following Example 1 a sand casting pattern coating can be prepared using the following ingredients:

| MATERIAL | PARTS BY WEIGHT |
| --- | --- |
| Mineral Seal oil | 2000 |
| Water | 2000 |
| Isopropanol | 100 |
| Oleic acid | 50 |
| Organophylic clay* | 100 |
| Graphite | 210 |

*Octadecylammonium bentonite

The foregoing materials when mixed in an ordinary mixer produce a stable emulsion which is not affected by cold or hot temperatures. When frozen, the material returns to a stable emulsion after minor mixing. When used on the pattern face in a facility the product gives excellent results, yielding castings which are extremely smooth.

As the examples show, various modifications are possible within the spirit of this invention. In addition to ingredients illustrated, such additives as surfactants, either anionic, cationic or nonanionic and other emulsifying agents can be employed. It has already been emphasized that either the organophylic clay or the amine and the clay can be incorporated in the composition during the mixing stage. These and other ramifications will occur to those skilled in the art. Such variations are deemed to be within the scope of this invention.

What is claimed is:

1. A pattern coating composition in the form of an oil-in-water emulsion comprising oil, water, graphite, a water dispersible amine, and a clay reactive with the amine to form an organophylic clay wherein the pattern coating composition comprises from about 0.05 to about 20 weight percent graphite and develops lustrous carbon at a mold metal interface when applied to mold pattern surfaces during sand casting.

2. The pattern coating composition of claim 1 wherein the oil comprises mineral seal oil, the amine is an oil soluble, water dispersible monobasic cyclic tertiary amine and the clay reactive therewith is attapulgite.

3. The pattern coating composition of claim 1 wherein the dispersible amine and the clay are prereacted to form the organophylic clay.

4. The pattern coating composition of claim 3 wherein the organophylic clay is octadecyl ammonium bentonite.

5. The pattern coating composition of claim 1 wherein the pattern coating composition comprises from about 0.05 to about 15 weight percent graphite.

6. The pattern coating composition of claim 5 wherein the pattern coating composition comprises from about 2 to about 10 weight percent graphite.

7. The pattern coating composition of claim 1 wherein said oil is selected from the group consisting of petroleum oil, vegetable oil and mixtures thereof.

8. The pattern coating composition of claim 7 wherein the oil comprises vegetable oil and the vegetable oil is selected from the group consisting of corn oil, sesame oil, rapeseed oil, sunflower oil, palm oil, coconut oil, peanut oil, soybean oil, canola oil and mixtures thereof.

9. The pattern coating composition of claim 7 wherein said oil comprises mineral seal oil.

10. In the process of protecting foundry molds from eroding and pitting during sandcasting by preventing adherence of molding sand to mold pattern surfaces, wherein a pattern coating composition is applied to the mold pattern surfaces in an amount sufficient to form a coating thereon which prevents adherence of sand to the mold pattern, the improvement comprising coating the mold pattern surfaces with a pattern coating composition in accordance with claim 1.

11. The process of claim 10 wherein the oil comprises mineral seal oil, the amine is an oil soluble, water dispersible monobasic cyclic tertiary amine and the clay reactive therewith is attapulgite.

12. The process of claim 10 wherein the dispersible amine and the clay are prereacted to form the organophylic clay.

13. The process of claim 12 wherein the organophylic clay is octadecyl ammonium bentonite.

14. The process of claim 10 wherein the pattern coating composition comprises from about 0.05 to about 15 weight percent graphite.

15. The process of claim 14 wherein the pattern coating composition comprises from about 2 to about 10 weight percent graphite.

16. The process of claim 10 wherein said oil is selected from the group consisting of petroleum oil, vegetable oil and mixtures thereof.

17. The process of claim 16 wherein the oil comprises vegetable oil and the vegetable oil is selected from the group consisting of corn oil, sesame oil, rapeseed oil, sunflower oil, palm oil, coconut oil, peanut oil, soybean oil, canola oil and mixtures thereof.

18. The process of claim 16 wherein said oil comprises mineral seal oil.

\* \* \* \* \*